United States Patent
Tobin et al.

(10) Patent No.: US 9,869,296 B2
(45) Date of Patent: *Jan. 16, 2018

(54) ATTACHMENT METHOD AND SYSTEM TO INSTALL COMPONENTS, SUCH AS TIP EXTENSIONS AND WINGLETS, TO A WIND TURBINE BLADE

(71) Applicant: General Electric Company, Schenectady, NY (US)

(72) Inventors: James Robert Tobin, Simpsonville, SC (US); Stefan Herr, Greenville, SC (US); William Max Gobeli, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 319 days.

This patent is subject to a terminal disclaimer.

(21) Appl. No.: 14/706,024

(22) Filed: May 7, 2015

(65) Prior Publication Data

US 2016/0327020 A1    Nov. 10, 2016

(51) Int. Cl.
*A46D 1/00* (2006.01)
*B44C 1/17* (2006.01)
(Continued)

(52) U.S. Cl.
CPC .......... *F03D 1/0675* (2013.01); *F03D 1/0633* (2013.01); *F05B 2230/60* (2013.01);
(Continued)

(58) Field of Classification Search
USPC ..... 156/60, 72, 91, 196, 212, 229, 230, 233, 156/235, 241, 247, 289, 290, 291, 718,
(Continued)

(56) References Cited

U.S. PATENT DOCUMENTS

RE19,412 E    1/1935  Zaparka
2,450,440 A  10/1948  Mills
(Continued)

FOREIGN PATENT DOCUMENTS

EP    2653717 A1    10/2013
EP    3 037 655 A1   6/2016
(Continued)

OTHER PUBLICATIONS

European Search Report and Opinion issued in connection with corresponding EP Application No. 16168433.7 dated Sep. 28, 2016.
Co-Pending U.S. Appl. No. 13/609,719, filed Sep. 11, 2012.

*Primary Examiner* — Sing P Chan
(74) *Attorney, Agent, or Firm* — Dority & Manning, P.A.

(57) ABSTRACT

A method for installing an add-on component onto a tip of a wind turbine blade, the associated blade, and the component, are provided. The add-on component has a span-wise end and a separated trailing edge, and is slidable onto the blade tip. Strips of a double-sided adhesive tape are attached onto either or both pressure and suction side surfaces of the blade adjacent the blade tip, or onto interior surfaces of the add-on component, the tape strips having a release liner on an opposite exposed side thereof. An extension tail is configured with the release liner that extends beyond the span-wise end of the add-on component when the add-on component is placed and held at a desired position on the blade. The add-on component is slid onto and maintained in position on the blade tip and, starting from the tape strip furthest from the separated trailing edge, extension tails of the respective tape strips are sequentially peeled through the separated trailing edge and away from the add-on component.

8 Claims, 6 Drawing Sheets

(51) Int. Cl.

| | | |
|---|---|---|
| B63H 1/26 | (2006.01) | |
| F03D 11/02 | (2006.01) | |
| B64C 11/16 | (2006.01) | |
| B64C 11/24 | (2006.01) | |
| D05C 15/00 | (2006.01) | |
| B32B 15/04 | (2006.01) | |
| B64C 27/46 | (2006.01) | |
| F04D 29/38 | (2006.01) | |
| B32B 3/06 | (2006.01) | |
| F03B 3/12 | (2006.01) | |
| B32B 33/00 | (2006.01) | |
| B32B 37/00 | (2006.01) | |
| B32B 38/10 | (2006.01) | |
| B32B 5/00 | (2006.01) | |
| F01D 5/14 | (2006.01) | |
| F01D 5/18 | (2006.01) | |
| B29C 51/16 | (2006.01) | |
| B29C 63/00 | (2006.01) | |
| B29C 65/00 | (2006.01) | |
| F03B 7/00 | (2006.01) | |
| B63H 7/02 | (2006.01) | |
| B32B 7/04 | (2006.01) | |
| B32B 7/12 | (2006.01) | |
| B32B 7/14 | (2006.01) | |
| B32B 9/00 | (2006.01) | |
| F03D 1/06 | (2006.01) | |

(52) U.S. Cl.
CPC ..... F05B 2230/80 (2013.01); F05B 2240/302 (2013.01); F05B 2250/183 (2013.01); F05B 2260/96 (2013.01); Y02E 10/721 (2013.01); Y02P 70/523 (2015.11)

(58) Field of Classification Search
USPC ...... 156/719; 428/40.1, 41.8, 100, 343, 352, 428/354; 416/223 R, 224, 228, 229 R, 416/241 R, 235, 236 A, 236 R
See application file for complete search history.

(56) References Cited

U.S. PATENT DOCUMENTS

| | | | |
|---|---|---|---|
| 3,137,887 A | 6/1964 | Manning et al. | |
| 3,528,753 A | 9/1970 | Dutton et al. | |
| 3,586,460 A | 6/1971 | Toner | |
| 4,236,873 A * | 12/1980 | Sherman | F03D 1/0658 416/204 R |
| 4,329,119 A | 5/1982 | Baskin | |
| 4,626,172 A | 12/1986 | Mouille et al. | |
| 5,088,665 A | 2/1992 | Vijgen et al. | |
| 5,346,367 A | 9/1994 | Doolin et al. | |
| 6,800,956 B2 * | 10/2004 | Bartlett | F03D 1/0675 290/44 |
| 6,890,152 B1 | 5/2005 | Thisted | |
| 7,040,864 B2 * | 5/2006 | Johansen | H02G 13/00 416/146 R |
| 7,059,833 B2 | 6/2006 | Stiesdal et al. | |
| 7,377,752 B2 * | 5/2008 | Mohamed | B29C 70/24 416/226 |
| 7,458,777 B2 | 12/2008 | Herr | |
| 7,637,721 B2 | 12/2009 | Driver et al. | |
| 7,841,835 B2 * | 11/2010 | Bagepalli | F03D 1/0675 416/226 |
| 7,980,515 B2 * | 7/2011 | Hunter | B64C 3/28 244/124 |
| 7,988,421 B2 | 8/2011 | Bakhuis et al. | |
| 7,998,303 B2 * | 8/2011 | Baehmann | B29C 65/542 156/293 |
| 8,083,488 B2 | 12/2011 | Fritz | |
| 8,162,590 B2 | 4/2012 | Haag | |
| 8,182,231 B2 * | 5/2012 | Corten | F03D 1/0641 416/223 R |
| 8,186,964 B2 * | 5/2012 | Bell | B29C 65/48 416/226 |
| 8,192,161 B2 * | 6/2012 | Baker | F03D 1/0641 416/23 |
| 8,221,078 B2 * | 7/2012 | Dawson | H02G 13/00 416/219 R |
| 8,250,761 B2 * | 8/2012 | Tobin | B29D 99/0025 29/889.7 |
| 8,376,450 B1 | 2/2013 | Long et al. | |
| 8,403,642 B2 * | 3/2013 | Carroll | F03D 1/0641 416/239 |
| 8,425,196 B2 * | 4/2013 | Fritz | F03D 80/70 416/224 |
| 8,500,406 B2 * | 8/2013 | Jimenez | B29C 61/00 416/1 |
| 8,506,250 B2 * | 8/2013 | Bagepalli | F03D 1/0675 29/889.71 |
| 8,540,491 B2 * | 9/2013 | Gruhn | B29B 11/16 416/230 |
| 8,662,853 B2 * | 3/2014 | Vasudeva | F03D 1/0675 29/889.71 |
| 8,678,746 B2 | 3/2014 | Haag | |
| 8,807,954 B2 * | 8/2014 | Gill | F03D 1/0675 29/525.13 |
| 8,876,483 B2 * | 11/2014 | Gruhn | B29B 11/16 416/230 |
| 9,016,989 B2 * | 4/2015 | Nagabhushana | B60P 7/02 410/44 |
| 9,033,671 B2 * | 5/2015 | Baucke | H01Q 17/00 416/226 |
| 9,033,672 B2 * | 5/2015 | Baucke | F03D 1/0675 416/226 |
| 9,051,919 B2 * | 6/2015 | Jensen | F03D 1/0608 |
| 9,133,816 B2 * | 9/2015 | Jensen | F03D 1/0608 |
| 9,140,234 B2 * | 9/2015 | Baucke | F03D 1/0675 |
| 9,168,705 B2 * | 10/2015 | Bendel | B29C 66/721 |
| 9,394,882 B2 * | 7/2016 | Gruhn | B29B 11/16 |
| 9,404,172 B2 * | 8/2016 | Clavette | B64C 11/205 |
| 9,429,140 B2 * | 8/2016 | Gruhn | B29B 11/16 |
| 9,492,973 B2 * | 11/2016 | Datta | B29C 70/443 |
| 9,523,279 B2 * | 12/2016 | Herr | F01D 5/12 |
| 9,581,133 B2 * | 2/2017 | Yao | F03D 1/0608 |
| 9,598,167 B2 * | 3/2017 | Grip | B64C 3/28 |
| 9,624,782 B2 * | 4/2017 | Booth | F01D 5/30 |
| 9,638,164 B2 * | 5/2017 | Vedula | F03D 1/0658 |
| 2003/0141721 A1 * | 7/2003 | Bartlett | F03D 1/0675 290/55 |
| 2004/0130842 A1 * | 7/2004 | Johansen | H02G 13/00 361/117 |
| 2005/0186081 A1 * | 8/2005 | Mohamed | B29C 70/24 416/226 |
| 2007/0036659 A1 * | 2/2007 | Hibbard | B29C 63/22 416/233 |
| 2007/0065290 A1 | 3/2007 | Herr | |
| 2007/0077150 A1 | 4/2007 | Llorente Gonzalez | |
| 2007/0189902 A1 * | 8/2007 | Mohamed | B29C 70/24 416/226 |
| 2009/0068018 A1 * | 3/2009 | Corten | F03D 1/0641 416/223 R |
| 2009/0074585 A1 | 3/2009 | Koegler et al. | |
| 2009/0146433 A1 * | 6/2009 | Althoff | B29C 70/845 290/55 |
| 2009/0285682 A1 * | 11/2009 | Baker | F03D 1/0641 416/1 |
| 2010/0062238 A1 * | 3/2010 | Doyle | B29C 70/02 428/295.1 |
| 2010/0132884 A1 * | 6/2010 | Baehmann | B29C 66/543 156/293 |
| 2010/0135806 A1 | 6/2010 | Benito | |
| 2010/0135815 A1 * | 6/2010 | Bagepalli | F03D 1/0675 416/226 |
| 2010/0148010 A1 * | 6/2010 | Hunter | B64C 3/28 244/199.4 |
| 2010/0260612 A1 * | 10/2010 | Vasudeva | F03D 1/0675 416/227 R |

(56) References Cited

U.S. PATENT DOCUMENTS

| | | | |
|---|---|---|---|
| 2010/0266408 A1* | 10/2010 | Dawson | H02G 13/00 416/87 |
| 2010/0296940 A1 | 11/2010 | Zuteck | |
| 2010/0296941 A1 | 11/2010 | Zuteck | |
| 2011/0018282 A1 | 1/2011 | Hayashi et al. | |
| 2011/0076149 A1 | 3/2011 | Santiago et al. | |
| 2011/0097326 A1 | 4/2011 | Luehrsen | |
| 2011/0135467 A1 | 6/2011 | Saddoughi et al. | |
| 2011/0135485 A1* | 6/2011 | Wang | F03D 1/0675 416/226 |
| 2011/0142635 A1 | 6/2011 | Frizt | |
| 2011/0142636 A1* | 6/2011 | Curtin | F03D 1/0658 416/62 |
| 2011/0142663 A1* | 6/2011 | Gill | F03D 1/0675 416/226 |
| 2011/0142667 A1 | 6/2011 | Miebach et al. | |
| 2011/0142668 A1 | 6/2011 | Rao | |
| 2011/0142679 A1* | 6/2011 | Bendel | B29C 66/721 416/241 R |
| 2011/0206529 A1* | 8/2011 | Bell | B29C 65/48 416/226 |
| 2011/0221093 A1* | 9/2011 | Perrow | B29C 70/44 264/255 |
| 2011/0223028 A1 | 9/2011 | Stege et al. | |
| 2011/0223032 A1* | 9/2011 | Tobin | B29D 99/0025 416/229 R |
| 2011/0243736 A1 | 10/2011 | Bell | |
| 2011/0243750 A1* | 10/2011 | Gruhn | B29B 11/16 416/226 |
| 2011/0243751 A1* | 10/2011 | Fritz | F03D 15/00 416/241 R |
| 2011/0268558 A1 | 11/2011 | Driver | |
| 2012/0027590 A1 | 2/2012 | Bonnet | |
| 2012/0049007 A1* | 3/2012 | Hunter | B64C 3/28 244/199.4 |
| 2012/0100005 A1* | 4/2012 | Ostergaard Kristensen | F03D 1/0608 416/241 R |
| 2012/0121430 A1 | 5/2012 | Olsen et al. | |
| 2012/0134817 A1* | 5/2012 | Bagepalli | F03D 1/0675 416/62 |
| 2012/0134838 A1* | 5/2012 | Ramirez Jimenez | B29C 61/00 416/229 R |
| 2012/0141281 A1* | 6/2012 | Carroll | F03D 1/0641 416/219 A |
| 2012/0257977 A1* | 10/2012 | Jensen | F03D 1/0608 416/223 R |
| 2012/0257978 A1* | 10/2012 | Jensen | F03D 1/0608 416/223 R |
| 2012/0257979 A1* | 10/2012 | Jensen | F03D 1/0608 416/223 R |
| 2012/0263601 A1* | 10/2012 | Baker | F03D 1/0641 416/223 R |
| 2012/0301316 A1* | 11/2012 | Velez Oria | F03D 1/0675 416/233 |
| 2012/0308394 A1* | 12/2012 | Gruhn | B29B 11/16 416/226 |
| 2013/0108457 A1* | 5/2013 | Thrue | F03D 1/0641 416/236 R |
| 2013/0177433 A1* | 7/2013 | Fritz | F03D 1/0675 416/226 |
| 2013/0177434 A1* | 7/2013 | Baucke | H01Q 17/00 416/229 R |
| 2013/0177435 A1* | 7/2013 | Baucke | F03D 1/0675 416/230 |
| 2013/0177436 A1* | 7/2013 | Baucke | F03D 1/0675 416/232 |
| 2013/0323070 A1* | 12/2013 | Grabau | F03D 1/0675 416/229 R |
| 2014/0023514 A1* | 1/2014 | Gruhn | B29B 11/16 416/230 |
| 2014/0072441 A1* | 3/2014 | Asheim | F03D 1/0608 416/241 R |
| 2014/0090781 A1* | 4/2014 | Gruhn | B29B 11/16 156/285 |
| 2014/0093378 A1* | 4/2014 | Clavette | B64C 11/205 416/224 |
| 2014/0119931 A1* | 5/2014 | Datta | B29C 70/443 416/223 R |
| 2014/0119933 A1* | 5/2014 | Bagepalli | F03D 1/0675 416/226 |
| 2014/0119937 A1* | 5/2014 | Fang | B29C 70/56 416/233 |
| 2014/0169978 A1* | 6/2014 | Livingston | F03D 1/0675 416/226 |
| 2014/0186175 A1 | 7/2014 | Baehmann et al. | |
| 2014/0227101 A1* | 8/2014 | Yao | F03D 1/0608 416/236 R |
| 2014/0286780 A1* | 9/2014 | Lemos | F03D 1/0675 416/210 R |
| 2014/0328692 A1 | 11/2014 | Riddell et al. | |
| 2014/0369845 A1* | 12/2014 | Ruijter | F01D 5/141 416/224 |
| 2015/0037112 A1* | 2/2015 | Nagabhushana | B60P 7/02 410/44 |
| 2015/0078911 A1* | 3/2015 | Gruhn | B29B 11/16 416/230 |
| 2015/0118058 A1* | 4/2015 | Vedula | F03D 1/0675 416/236 R |
| 2015/0132135 A1* | 5/2015 | Booth | F01D 5/30 416/204 R |
| 2015/0132138 A1* | 5/2015 | Herr | F01D 5/12 416/223 A |
| 2015/0267681 A1* | 9/2015 | Ruijter | F03D 13/10 415/208.2 |
| 2015/0275855 A1* | 10/2015 | Pal | F03D 13/10 416/224 |
| 2015/0330231 A1* | 11/2015 | McGuire | F01D 5/28 428/36.9 |
| 2016/0009372 A1* | 1/2016 | Grip | B64C 3/28 244/214 |
| 2016/0047252 A1* | 2/2016 | Merzhaeuser | B29C 70/00 416/229 A |
| 2016/0177921 A1* | 6/2016 | Gruhn | B29B 11/16 416/230 |
| 2016/0281680 A1* | 9/2016 | Randall | F03D 1/0683 |
| 2016/0305399 A1* | 10/2016 | Spandley | B29C 70/342 |
| 2016/0319801 A1* | 11/2016 | Smith | B29C 70/44 |
| 2016/0327019 A1* | 11/2016 | Tobin | F03D 1/0675 |
| 2016/0327020 A1* | 11/2016 | Tobin | F03D 1/0633 |
| 2016/0327021 A1* | 11/2016 | Tobin | F03D 1/0675 |
| 2016/0333850 A1* | 11/2016 | Gruhn | B29B 11/16 |
| 2016/0348643 A1* | 12/2016 | Fujioka | F03D 1/0675 |
| 2016/0368228 A1* | 12/2016 | Datta | B29C 70/443 |
| 2017/0058868 A1* | 3/2017 | Caruso | F03D 1/0683 |
| 2017/0101979 A1* | 4/2017 | Tobin | F03D 1/0658 |
| 2017/0121877 A1* | 5/2017 | Ramachandran | F03D 1/0675 |
| 2017/0137116 A1* | 5/2017 | Ireland | B64C 23/06 |
| 2017/0165923 A1* | 6/2017 | Chen | B29C 70/36 |
| 2017/0218916 A1* | 8/2017 | Lehmann Madsen | F03D 1/0641 416/223 R |

FOREIGN PATENT DOCUMENTS

| | | |
|---|---|---|
| WO | WO 2012/076168 A2 | 6/2012 |
| WO | WO 2013/023745 A1 | 2/2013 |
| WO | 2013178624 A2 | 12/2013 |

\* cited by examiner

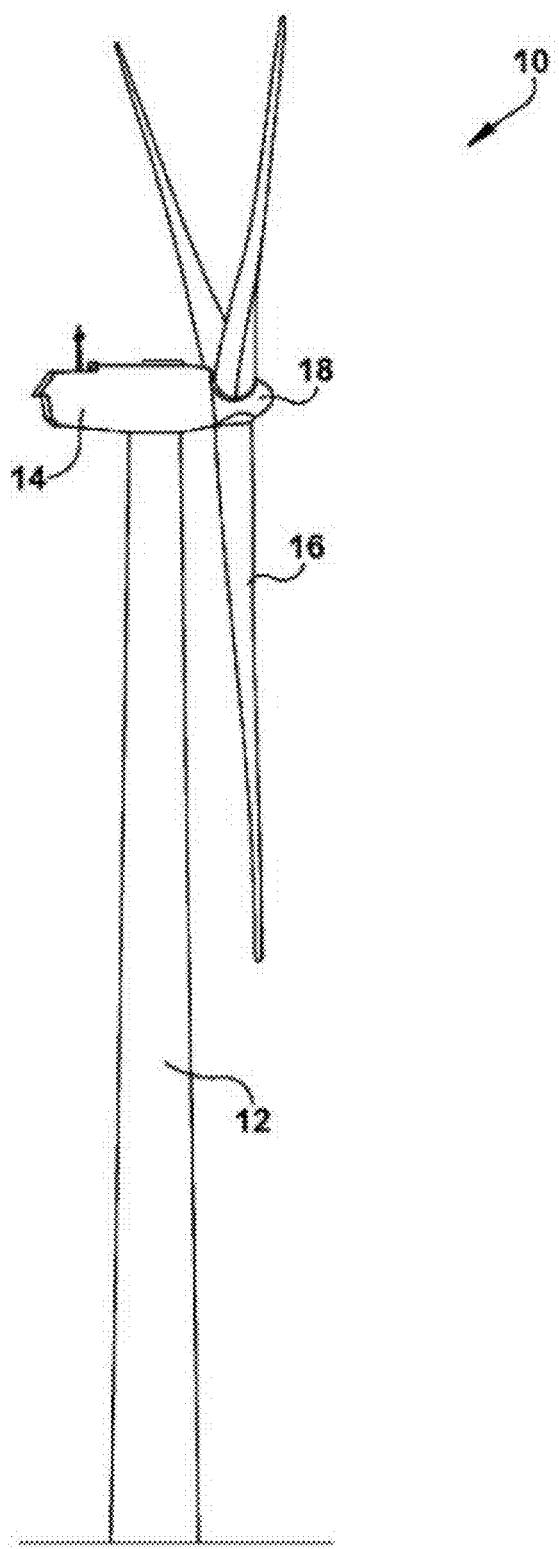
FIG. -1-

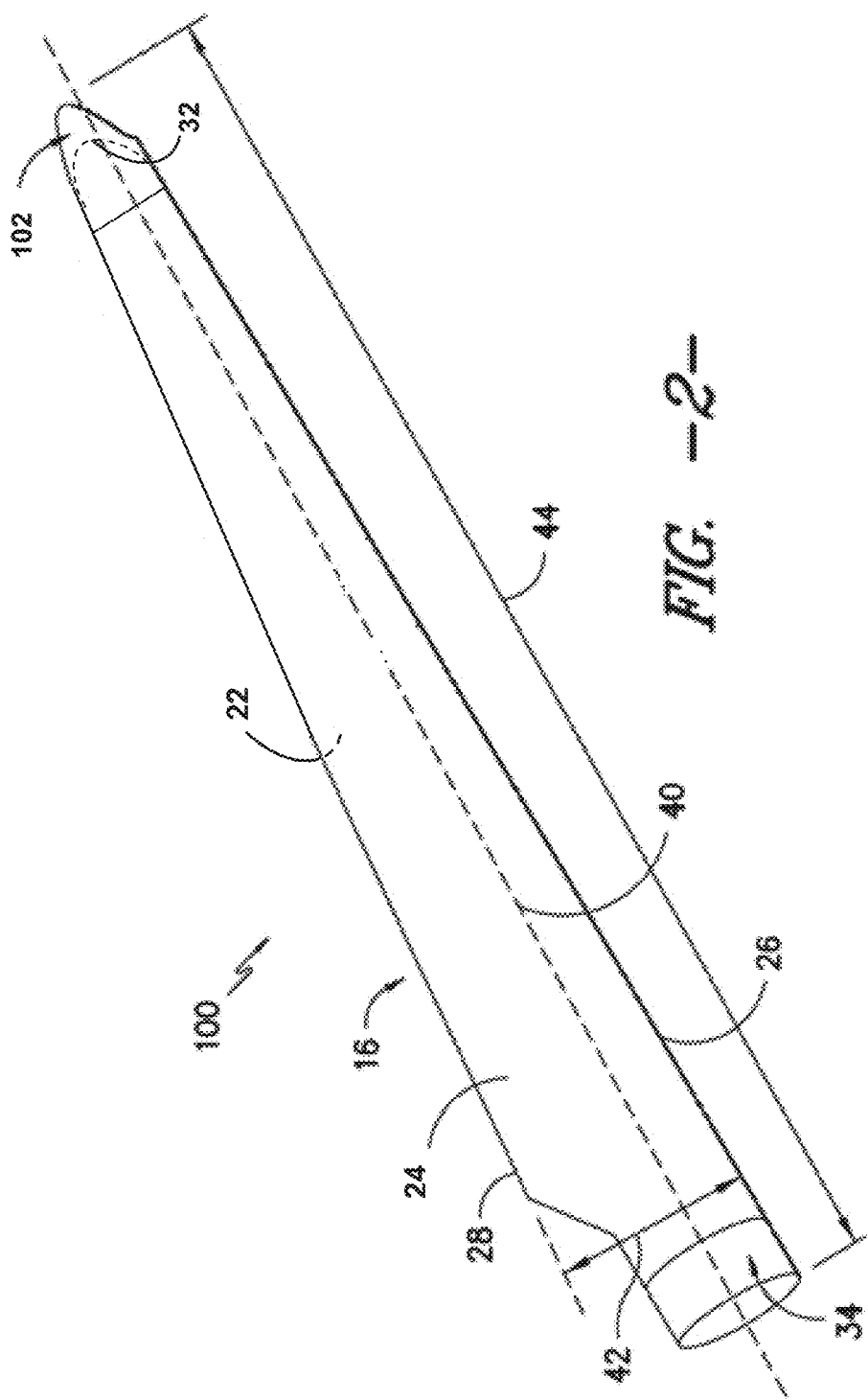
FIG. -2-

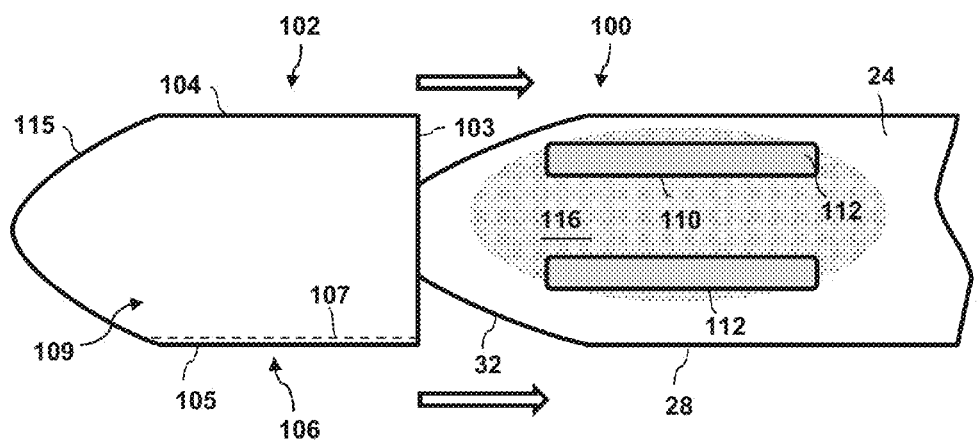
*FIG. -3-*
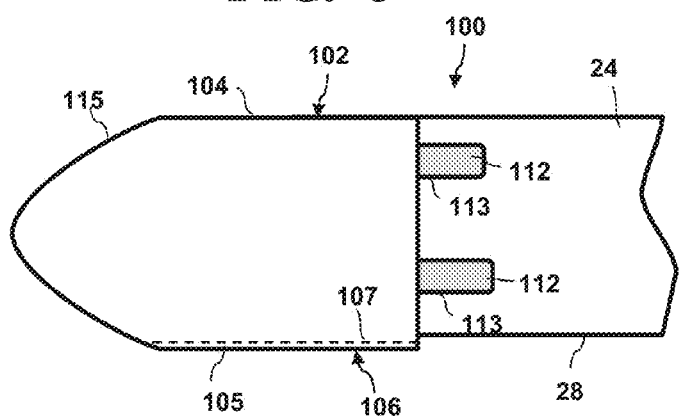
*FIG. -4-*
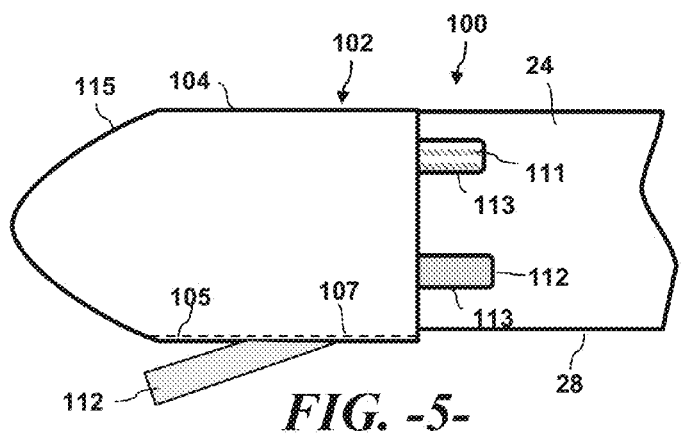
*FIG. -5-*

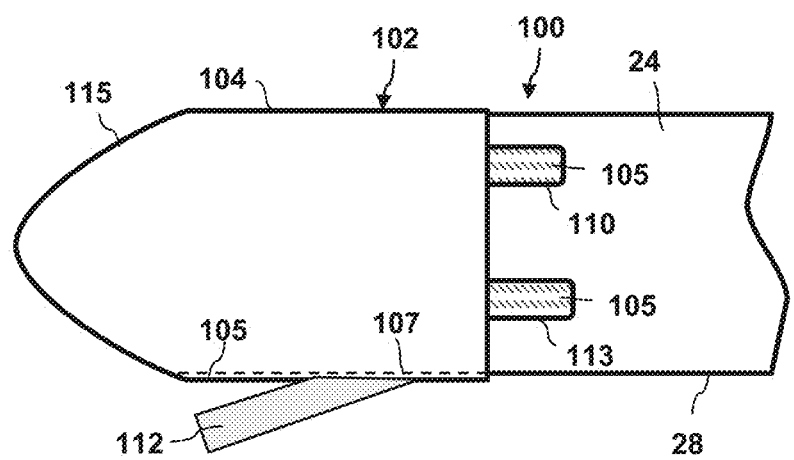
FIG. -6-
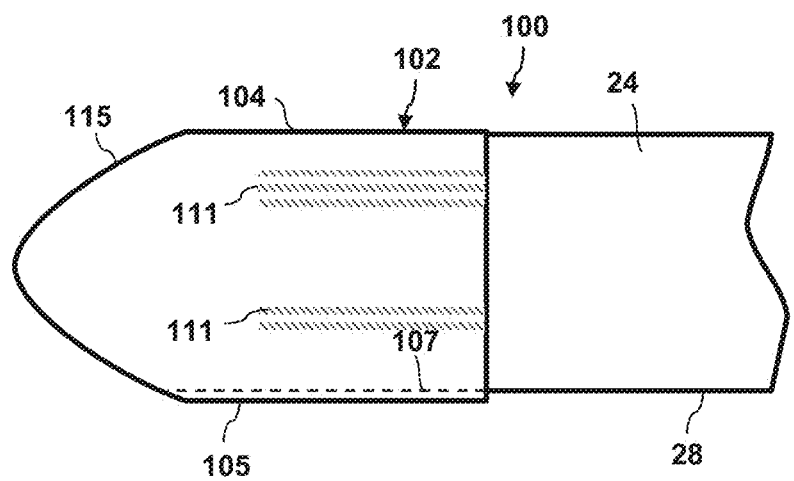
FIG. -7-

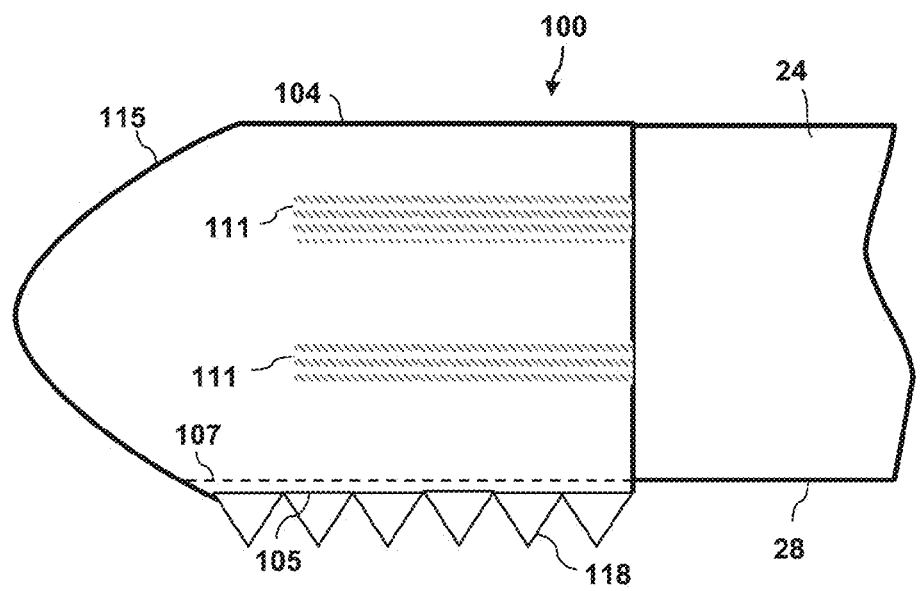
FIG. -8-
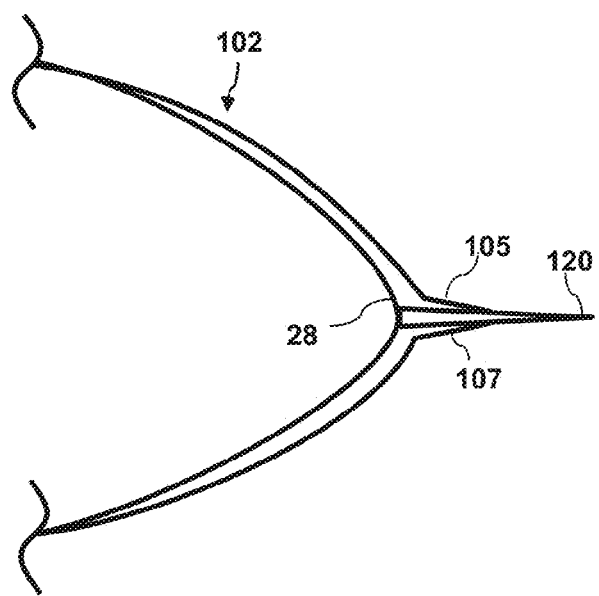
FIG. -9-

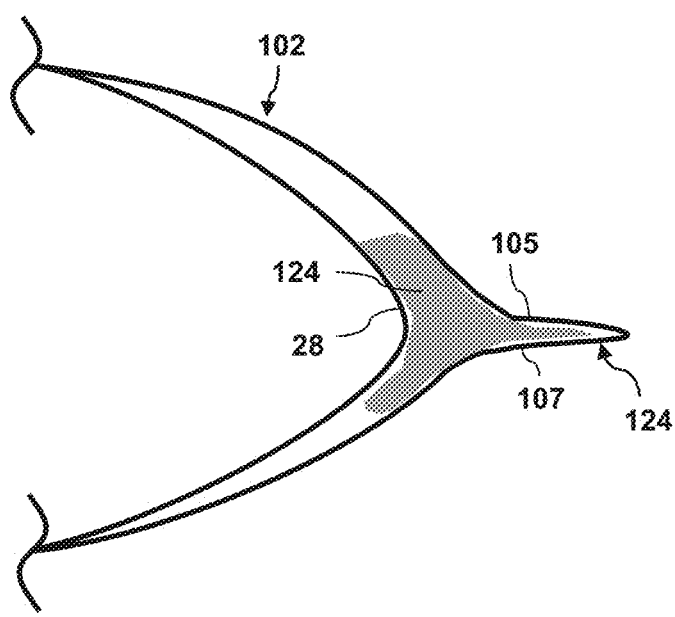
FIG. -10-

ATTACHMENT METHOD AND SYSTEM TO INSTALL COMPONENTS, SUCH AS TIP EXTENSIONS AND WINGLETS, TO A WIND TURBINE BLADE

FIELD OF THE INVENTION

The present disclosure relates in general to wind turbine rotor blades, and more particularly to a system and method for attaching components, such as tip extensions, winglets, and vortex generators to the wind turbine blade.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

In many cases, accessory components are attached to the rotor blades of wind turbines to perform various functions during operation of the wind turbine. For example, it is known to change the aerodynamic characteristics of wind turbine rotor blades by adding protrusions or other structures to the surface of the blade in order to increase the energy conversion efficiency during normal operation of the wind turbine by increasing the lift force of the blades while decreasing the drag force. Such components include, for example, winglets, tip extensions, and vortex generators. The purposes and operational principals of these devices are well understood by those skilled in the art.

The installation techniques and systems for attaching conventional add-on components can be expensive and time consuming, particularly for field installations. For example, typical field installation techniques require the use of attachment fixtures and significant dwell time for curing the attachment adhesives. The adhesives typically are considered hazardous materials and appropriate precautions and protective measures (both equipment and personal) must be taken. In addition, the smearing of liquid or past adhesives while pushing the add-on components into place can result in inconsistent and unpredictable results, particularly for tip extension add-ons that are pushed onto the tip end of an existing blade in the field.

Especially for the addition of tip extensions, the prevalent conventional method involves cutting off the existing blade tip so as to integrate the extension with internal blade structure. This process is time consuming, expensive and has the risk of damage to the main blade structure.

The industry has recognized that double-sided strain isolation tapes offer substantial benefits for attaching add-on components, but the use of such tapes has proven to be challenging to precisely install the components (especially larger components) due to the instant bond once the tape makes contact with a mating surface. Repositioning of the part can be difficult, if not impossible.

U.S. Pat. Pub. No. 2014/0328692 describes a vortex generator accessory that is mounted to either of the suction side or pressure side of a wind turbine blade and includes a base portion and a protrusion member extending upwardly from the base portion. An attachment layer connects the base portion to the suction or pressure side. The attachment layer has a lower shear modulus than the base portion to allow for shear slippage between the base portion and the underlying suction or pressure side. The attachment layer may be a foam-based strip member with adhesive on opposite interface sides thereof. For example, this attachment layer may be Very High Bond (VHB™) or SAFT (Solar Acrylic Foam Tape) foam-based strip material.

Thus, the industry is continuously seeking improved methods for installing add-on components to wind turbine blades in a fast and low-cost operation that also provides for a repositioning opportunity to ensure accurate add-on component placement.

BRIEF DESCRIPTION OF THE INVENTION

Aspects and advantages of the invention will be set forth in part in the following description, or may be obvious from the description, or may be learned through practice of the invention.

In accordance with aspects of the invention, a method is provided for installing an add-on component onto a tip of a wind turbine blade. The add-on component may be, for example, a blade tip extension or a winglet attached to the blade tip. The add-on component has a span-wise end, a closed leading edge, and a separated trailing edge, and is slidable onto the blade tip so as to overlap the wind turbine blade adjacent the blade tip. The method includes attaching an adhesive side of one or more strips of a double-sided adhesive tape (referred to collectively herein as "tape strips") onto either or both surfaces (pressure side surface or suction side surface) of the wind turbine blade adjacent the blade tip or onto interior surfaces of the add-on component, the tape strips having a release liner on an opposite exposed side thereof. Each of the tape strips has a an extension tail of the release liner that extends beyond the span-wise end of the add-on component when the add-on component is placed and held at a desired position on the wind turbine blade.

The method further includes sliding the add-on component onto the blade tip. Then, with the add-on component held at the desired position and starting from the tape strip furthest from the separated trailing edge, sequentially pulling the extension tail and release liner of the respective tape strips through the separated trailing edge and away from the add-on component at an angle such that the release liner is removed along the length of the tape strip while pressing the add-on component against the wind turbine blade to attach the exposed adhesive under the release liner to either the surface of the wind turbine blade or the interior surface of the add-on component. The remaining portions of the extension tails can then be trimmed off, or left remaining on the blade surface.

In a particular embodiment, the separated trailing edge of the add-on component has a pressure side edge and a suction side edge, the method further including sealing or bonding the edges of the separated trailing edge subsequent to removal of the release liners. The pressure side and suction side edges of the separated trailing edge may extend past the trailing edge of the wind turbine blade to provide a chord extension aspect to the add-on component, and be bonded together at this location. With this embodiment, it is possible to define an aerodynamic feature, such as a serrated edge, in the sealed pressure and suction side edges of the separated trailing edge.

In an alternate embodiment, the pressure side and the suction side edges of the separated trailing edge are offset such that one extends chord-wise beyond the other respective edge past the trailing edge of the blade. An aerodynamic feature, such as a serrated edge, may be defined in the pressure side edge or suction side edge that extends beyond the other respective edge. For example, the suction side edge of the separated trailing edge may extend past the pressure side edge, with the aerodynamic feature defined in the suction side edge of the separated trailing edge.

In still another embodiment, an aerodynamic insert may be bonded between portions of the pressure and suction side edges that extend past the trailing edge of the wind turbine blade.

In one method embodiment, the tape strips have a release liner on each opposite side thereof and are initially attached to surfaces of the wind turbine blade by removing the release liner completely from one of the sides and pressing the tape strips onto the surfaces of the wind turbine blade. The release liners (via the extension tails) are then peeled away from the add-on component through the separated trailing edge, whereby the adhesive under the release line attaches to the interior surface of the add-on component. With this embodiment, the tape strips are applied to one or both of the suction side or pressure side of the wind turbine blade adjacent the blade tip.

The present invention also encompasses various embodiments of a wind turbine blade incorporating an add-on component, such as a blade tip extension or a winglet, attached as set forth above and described in greater detail herein. For example, the invention encompasses a wind turbine blade with an add-on component attached to a surface thereof, the wind turbine blade having a tip, a pressure side surface, and a suction side surface. The add-on component is slid onto the blade tip so as to overlap the pressure side surface and the suction side surface. The add-on component has a span-wise end and a trailing edge defined by separate pressure side and suction side surface edges that are bonded together and extend chord-wise beyond a trailing edge of the wind turbine blade. Strips of a double-sided adhesive tape are attached in a defined pattern between the add-on component and the wind turbine blade, the tape strips spaced apart and extending span-wise adjacent to the tip, the tape strips bonding the add-on component to the either or both of the pressure side surface or suction side surface of the wind turbine blade.

For the method and wind turbine blade embodiments, it should be appreciated that the examples described herein may be implemented with a number of different commercially available double-sided adhesive tapes. These tapes generally have a lower shear modulus than the base portion of the add-on component to allow for shear slippage between the base portion and the underlying blade surface. For example, the tape strips may be a foam-based strip member with adhesive on opposite interface sides thereof, such as a Very High Bond (VHB™) or SAFT (Solar Acrylic Foam Tape) foam-based strip material.

The invention also encompasses various embodiments of an add-on component as a stand-alone device for subsequent attachment to a wind turbine blade tip. The add-on component may include any of the features discussed above or described in greater detail below.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of a conventional wind turbine;

FIG. 2 is a perspective view of an embodiment of a wind turbine blade with add-on components in accordance with the present disclosure;

FIG. 3 is a partial top view of a wind turbine blade with an add-on component in the form of a tip extension being slid onto the blade;

FIG. 4 is a partial top view of the embodiment of FIG. 3 after the add-on component has been slid into position on the wind turbine;

FIG. 5 is a partial top view of the embodiment of FIG. 4 depicting the release liners being peeled from tape strips through the separated trailing edge of the add-on component;

FIG. 6 is a partial top view of the embodiment of FIG. 5 depicting the last release liner being peeled from tape strips through the separated trailing edge of the add-on component;

FIG. 7 is a partial top view of the embodiment of FIG. 6 after final assembly of the add-on component on the wind turbine blade;

FIG. 8 is a partial top view of a wind turbine rotor blade and attached add-on component with an aerodynamic feature incorporated into the add-on component;

FIG. 9. is a partial side view of a tip of a wind turbine blade with attached add-on component and aerodynamic insert; and FIG. 10 is a partial side view of a tip of a wind turbine blade with attached add-on component with filler material at a transition to the trailing edge of the add-on component.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Referring to FIG. 2, a wind turbine blade assembly 100 is illustrated with a an add-on component 102 in the form of a tip extension attached to a surface 24 (e.g., suction side surface) of the blade 16 in accordance with aspects of the present invention. The blade 16 has a pressure side 22 and a suction side 24 extending between a leading edge 26 and a trailing edge 28, and extends from a blade tip 32 to a blade root 34. The blade 16 further defines a pitch axis 40 relative to the rotor hub 18 (FIG. 1) that typically extends perpendicularly to the rotor hub 18 and blade root 34 through the center of the blade root 34. A pitch angle or blade pitch of the blade 16, i.e., an angle that determines a perspective of the rotor blade 16 with respect to the air flow past the wind turbine 10, may be defined by rotation of the blade 16 about the pitch axis 40.

The wind turbine blade assembly 100 defines a chord 42 and a span 44. As shown in FIG. 2, the chord 42 may vary throughout the span 44 of the rotor blade 16. Thus, a local chord may be defined for the blade 16 at any point on the blade 16 along the span 44.

It should be appreciated that the present method for forming a blade assembly 100 in accordance with aspects of the invention by attaching an add-on component 102 is relevant to attaching any component to any outside surface of the blade 16. The method is particularly useful for an add-on component that slides onto the blade tip 32 and overlaps at least a portion of the pressure 22 and suction 24 side surfaces of the blade 16. For example, referring to FIG. 3, the add-on component 102 has a generally hollow body 109 configured as a blade tip extension 115 having a span-wise end 103, a closed leading edge 104, and a separated trailing edge 106. The trailing edge 106 is separated in that the a suction side edge 105 and a pressure side edge 107 are not bonded or sealed together along at least part of the length of the trailing edge 106, which allows the pressure and suction sides of the add-on component to be pulled apart to an extent necessary to slide the add-on component 102 onto the blade tip 32. In certain embodiments as depicted in the figures, the trailing edge 106 is separated along essentially the entire length of the trailing edge, although this is not a requirement for all embodiments.

Although FIG. 3 depicts (by arrows) the add-on component being slid linearly in a span-wise direction onto the blade 16, it should be appreciated that this sliding motion may include a chord-wise direction component that is aided by the separated nature of the trailing edge 106.

Referring to the embodiment of FIGS. 3 through 7, strips of a double-sided adhesive tape 110 are adhered in any desired pattern or configuration onto the blade surface 24 (e.g., the suction side surface) adjacent to the blade tip 32. It should be appreciated that a single, larger strip of tape 110 could also be utilized in place of multiple strips. Although not depicted in the figures, the tape strips may also be adhered to the pressure side surface 22. The pattern of the tape strips 110 may be span-wise oriented and spaced-apart, as depicted in FIG. 3. It should be appreciated that the tape strips 110 may be applied to either or both of the blade surfaces 22, 24. The tape strips 110 have a release liner 112 attached to exposed sides of the tape 110 to protect an underlying adhesive layer 111.

In the embodiment of FIG. 3, the tape strips 110 are initially adhered to the blade surface 24, wherein the add-on component 102 is subsequently held or otherwise maintained in the desired position on the blade (e.g., by being pressed against the tape strips 110) for subsequent removal of the release liner 112 from between the underside of the add-on component and the tape 110. It should be appreciated that there may be some degree of inherent "play" or movement of the add-on component 102 at the desired position on the blade as the release liners 112 are removed.

In an alternate embodiment, the tape strips 110 may be applied to an interior surface of the add-on component 102 in the same pattern discussed above, which is then pressed against the blade surface 24, 22 for subsequent removal of the release liner 112 from the opposite side of the tape 110 (as explained more fully below).

FIG. 3 also depicts an additional aspect that may be incorporated into any of the other embodiments described herein. In particular, an adhesive 116 is depicted as underlying the adhesive tape strips 110. In certain embodiments, it may be desired to coat the surface of the blade where the add-on component will be placed with a liquid or paste adhesive (e.g., and epoxy) 116, for example to compensate for any surface irregularities or mismatch between the blade surface and the add-on component 102 due, for example, to machining tolerances, before positioning the tape strips 110 on the blade surface 24. The tape strips 110 and add-on component can then be attached before the adhesive 116 cures, which provides a degree of positioning adjust of the add-on component 102 due to the fact that the adhesive 116 is still in liquid or paste form. Alternatively, the adhesive 116 (with tape strips attached thereto) may be allowed to cure before placement of the add-on component. In either case, this particular embodiment also gives the advantage of a strong bond provided by the adhesive 116 in combination with the shear stress reduction provided by the tape strips 110.

In the illustrated embodiments, each of the tape strips 110 has a length so as to define an extension tail 113 that extends span-wise beyond the span-wise end 103 of the add-on component 102. The length of the extension tails 113 may vary. For example, the strips 110 furthest from the trailing edge 106 may have a longer extension tail 113 to facilitate pulling the extension tail through the trailing edge 106, as compared to the tape strip 110 closest to the trailing edge. Alternatively, the extension tail may encompass any other material or component that is attached to the tape strip, such as a wire, string, ribbon, and so forth. With the illustrated embodiment, because the extension tails 113 are comprised of the release liner 112 and underlying adhesive, as depicted in FIG. 4, after removal of the release liner 112, the remaining adhesive layer of the tape strips adhesive 111 remains, as depicted in FIG. 5, and may need to be trimmed.

Referring to FIGS. 4 through 7, with the add-on component 102 held at the desired position on the blade tip 32, starting from the tape strip 110 furthest from the separated trailing edge 106, the extension tails 113 and release liners 112 of the respective tape strips are pulled through the separated trailing edge 106 and away from the add-on component 102 at an angle such that that entire release liner 112 is removed along the length of the tape strip 110 while maintaining position of the add-on component 102 against the blade surface 24 to attach the exposed adhesive 111 under the release liner 112 to either the surface 24 of the wind turbine blade or the interior surface of the add-on component (depending on initial placement of the tape strips 110 on the blade surface 24 or on the interior surface of the add-on component 102).

After all of the release liners 112 have been removed in sequential order from furthest to closest to the separated trailing edge 106, the remaining adhesive layers 111 can be trimmed to provide the finished blade depicted in FIG. 7.

Referring to FIGS. 3 through 7, the suction side and pressure side edges 105, 107 of the separated trailing edge 106 extend past the trailing edge 28 of the wind turbine blade to provide a chord-wise extension aspect to the add-on component 102. These edges can then be bonded together after attaching the add-on component 102 to the blade in the manner discussed above. The edges 105, 107 may extend an equal chord-wise distance past the blade trailing edge 28, or the edges 105, 107 may be offset in that one of the edges extends past the other. The dashed line indicating the pressure side surface edge 107 is meant to depict both of these configurations.

Referring to FIG. 8, an embodiment includes an aerodynamic feature 118, for example in the form a serrated edge, in the bonded suction and pressure side surface edges 105, 107. If the edges 105, 107 are not offset, this feature 118 may be defined (e.g., by laser cutting) into the combination of the bonded surfaces 105, 107. In an alternate embodiment, to reduce the thickness of the aerodynamic feature 118, the feature may be defined in one of the edges 105, 107 that extends chord-wise beyond the other edge. For example, in the embodiment depicted in FIG. 8 the suction side surface edge 105 of the separated trailing edge 106 extends past the pressure side surface edge 107, with the aerodynamic feature 118 defined in the suction side surface edge 105 in the form of a serrated edge.

It should be appreciated that the aerodynamic feature 118 is depicted as a serrated profile for purposes of illustration only, and that any design of aerodynamic feature 118 is within the scope and spirit of the invention.

In an alternate embodiment depicted in FIG. 9, the suction side and pressure side surface edges 105, 107 extend equally beyond the trailing edge 28 of the blade tip and an aerodynamic insert 120 is bonded between the edges 105, 107. This insert 120 may be in the form of a serrated strip.

FIG. 10 depicts and embodiment wherein the extended suction side and pressure side surface edges 105, 107 define a trailing edge extension beyond the trailing edge 28 of the blade. This configuration may be desired in order to reduce the overall thickness of the ultimate trailing edge for noise considerations. For example, if the edges 105, 107 were co-terminus with the blade trailing edge 28, the overall thickness at the trailing edge 28 would be substantially increased, thereby creating a potential noise generation problem. In this regard, extending the edges 105, 107 past the trailing edge 28 and bonding the edges to create a trailing edge extension 122 will reduce the overall thickness of the ultimate trailing edge. With this configuration, however, it may be further desired for noise purposes to minimize the "step" profile at the transition from the blade trailing edge 28 and the add-on component edges 105, 107 by providing a more rounded transitions point. This can be accomplished, for example, by providing any manner of filler material 124 (e.g., epoxy, paste, fiber or mat material, etc.) between the edges 105, 107, or by machining the surfaces of the add-on component at the transition point to provide a more rounded transition profile.

It should be appreciated that the methods described herein may be implemented with a number of different commercially available double-sided adhesive tapes. These tapes generally have a lower shear modulus than the base portion of the add-on component to allow for shear slippage between the base portion and the underlying blade surface. For example, the tape strips may be a foam-based strip member with adhesive on opposite interface sides thereof, such as a Very High Bond (VHB™) or SAFT (Solar Acrylic Foam Tape) foam-based strip material.

The present invention includes embodiments of a wind turbine blade assembly 100 incorporating an add-on component 120 attached as described above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for installing an add-on component onto a tip of a wind turbine blade, the add-on component having a span-wise end, a closed leading edge, and an at least partially separated trailing edge, and slidable onto the blade tip so as to overlap the wind turbine blade adjacent the blade tip, the method comprising:

attaching an adhesive side of one or more strips of a double-sided adhesive tape onto either or both of the pressure side or suction side surfaces of the wind turbine blade adjacent the blade tip or onto interior surfaces of the add-on component, the tape strips having a release liner on an opposite exposed side thereof;

each of the tape strips having an extension tail from the release liner that extends beyond the span-wise end of the add-on component when the add-on component is placed and held at a desired position on the wind turbine blade;

sliding the add-on component onto the blade tip; and with the add-on component held at the desired position, starting from the tape strip furthest from the separated trailing edge, sequentially pulling the extension tail and release liner of the respective tape strips through the separated trailing edge and away from the add-on component at an angle such that that the release liner is removed along the length of the tape strip while maintaining position of the add-on component against the wind turbine blade to attach the exposed adhesive from under the release liner to either the surface of the wind turbine blade or the interior surface of the add-on component.

2. The method as in claim 1, wherein the add-on component is one of a tip extension or winglet.

3. The method as in claim 1, wherein the separated trailing edge has a pressure side edge and a suction side edge that extend past a trailing edge of the wind turbine blade, and further comprising bonding the pressure and suction side edges subsequent to removal of the release liners to define a trailing edge extension.

4. The method as in claim 3, further comprising providing a filler material between the pressure side edge and suction side edge at the trailing edge extension to reduce a transition point from the trailing edge of the wind turbine blade to the trailing edge extension.

5. The method as in claim 3, wherein the pressure side and the suction side edges of the separated trailing edge are offset such that one edge extends chord-wise beyond the other respective edge, and further comprising defining an aerodynamic feature in the pressure side edge or suction side edge that extends chord-wise beyond the other respective edge.

6. The method as in claim 1, wherein the separated trailing edge has a pressure side edge and a suction side edge that extend past a trailing edge of the wind turbine blade, and further comprising locating and bonding an aerodynamic insert between portions of the pressure side and suction side edges that extend past the trailing edge of the wind turbine blade.

7. The method as in claim 1, wherein the tape strips are initially attached to one or both of the suction side or pressure side surfaces of the wind turbine blade, and as the release liner is pulled away through the separated trailing edge, the adhesive under the release line attaches to an interior surface of the add-on component.

8. The method as in claim 1, further comprising trimming the extension tail from the tape strips after the add-on component is adhered to the blade tip.

\* \* \* \* \*